Aug. 1, 1933.  D. B. HOSEASON  1,920,309
ELECTRIC MOTOR
Filed Oct. 22, 1929    3 Sheets-Sheet 1

INVENTOR
Donald B. Hoseason.
BY
Wesley G. Carr
ATTORNEY

Aug. 1, 1933.   D. B. HOSEASON   1,920,309
ELECTRIC MOTOR
Filed Oct. 22, 1929   3 Sheets-Sheet 2

INVENTOR
Donald B. Hoseason.
BY
Wesley G. Carr
ATTORNEY

Patented Aug. 1, 1933

1,920,309

UNITED STATES PATENT OFFICE 1,920,309

ELECTRIC MOTOR

Donald Bright Hoseason, Bowdon, England, assignor to Associated Electrical Industries Limited, a Company of Great Britain Application October 22, 1929, Serial No. 401,441, and in Great Britain November 5, 1928

4 Claims. (Cl. 171—252.)

My invention relates to electric induction motors of the ventilated type in which cooling of the motors is effected by external air, and has for its object to improve the output efficiency or power-weight ratio of motors of this type without the usual permissible rise in temperature under load being exceeded.

For many years past it has been the desire of motor manufacturers to increase the power of their motors for a given weight and designers have striven to attain this object, since, in addition to other advantages, in many cases material is the main item in determining the cost of a motor. An upper limit of the power-weight ratio appears, however, to have been reached and at the date of this invention the power-weight ratio of motors of given rating and speed made by most manufacturers in England varies very little from the figures given in the following table which indicates typical examples of current commercial practice in Great Britain for three different makes and in the United States of America for one make of 50 cycle induction motors of the type to which my invention relates:

| H. P. | Speed R. P. M. | Make A. H. P. per lb. | Make B. H. P. per lb. | Make C. H. P. per lb. | Make D. H. P. per lb. |
|---|---|---|---|---|---|

(I) Squirrel cage

| | | | | | |
|---|---|---|---|---|---|
| 5 | 1430 | .0368 | .0315 | .031 | .0327 |
| 10 | 1440 | .0378 | .039 | .0395 | .037 |
| 20 | 960 | .0385 | .0373 | .032 | .0362 |
| 30 | 960 | .0518 | .0393 | | .040 |
| 50 | 720 | .035 | .0365 | .0375 | .045 |
| 100 | 720 | .043 | .0463 | .0464 | .0494 |

(II) Slip ring

| | | | | | |
|---|---|---|---|---|---|
| 5 | 1420 | .0137 | .0228 | .0195 | .0209 |
| 5 | 715 | .01265 | .0132 | | .0147 |
| 10 | 1440 | .0253 | .0298 | .0282 | .035 |
| 10 | 715 | .019 | .0206 | | .0206 |
| 20 | 960 | .029 | .0227 | .0263 | .0342 |
| 30 | 720 | .023 | .0205 | .0274 | .0268 |
| 50 | 720 | .0325 | .0321 | .0344 | .0417 |
| 100 | 720 | .036 | .0413 | .0434 | .0435 |

The condition which limits the ratio of power to weight for all designers is the permissible rise in stator and rotor temperatures under load, which is fixed in Great Britain according to generally accepted standards at 40° C. above atmospheric temperature where fibrous insulation is used.

In order to dispose of the heat generated in the windings of some classes of electrical machines such as turbo-alternators, tunnels or ducts in the iron core parallel with the axis have been employed through which cooling air is circulated. In such machines the employment of these ducts involved no particular difficulty because firstly the radius of the core iron is considerably greater than in induction motors, since the number of poles is smaller and the speed correspondingly higher, and secondly in alternators the flux density is such that the core iron approaches magnetic saturation in order to obtain voltage stability, whereas in induction motors the flux density is such that the core iron is unsaturated in order that the power factor shall be reasonable. For a given volume of core iron removed, a large number of ducts of small cross-section gives a greater total cooling surface area than is given by a smaller number of larger ducts, but small ducts are liable to become choked with dust and dirt. In turbo-alternators, the ducts are therefore commonly of the order of one inch in diameter. Since there is less radial depth of iron in a motor it would be desirable to reduce the size of the cooling ducts proportionately if such were used, but for the reason mentioned above it is impracticable to have ducts of less than one-half or three-eighths of an inch in diameter.

If attempts are made to utilize such axial ducts in a motor it becomes necessary, in order to avoid excessive flux densities or poor performance, to increase the size of the rotor and stator laminations to such an extent as materially to decrease instead of increasing the power-weight ratio. The use of such tunnels in ordinary industrial electric induction motors which depend upon circulation of external air for cooling purposes was therefore considered undesirable.

I have however discovered that the increase in weight in the core laminations which becomes necessary in order to allow of suitable ventilation ducts or tunnels being provided therein can be much more than counter-balanced and a substantial increase in the power-weight ratio of a motor effected without producing an impermissible rise in temperature, by the great increase in the current density which can be employed in the slot conductors, provided precautions are taken to ensure that the flow of heat from the slot conductors into the iron core and to the surface of the cooling ducts is made sufficiently large and the velocity of the air passing through the ducts is made sufficiently high to extract the heat from the core.

I have also discovered by actual measurement that although the temperature of the air rises continuously as it passes through the motor, the temperature of different parts of the motor in the direction of air flow does not rise correspondingly with the increase in air temperature and I attribute this to the relatively much greater cooling effect due to the high air velocity. I accordingly apply to good effect the phenomenon of what may be called the "scrubbing" action of air at high velocity in the removal of heat from solid surfaces over or against which the air is caused to flow.

By the means broadly set forth above a remarkable increase in the power-weight ratio of a motor of given size may be obtained while maintaining the normal high standard of performance and without exceeding a given temperature rise.

According to this invention ventilation tunnels or ducts having a relatively large cooling surface area are provided in the iron core, as hereinbefore indicated, such tunnels or ducts being preferably arranged generally parallel with the axis of the motor, and external cooling air is caused to flow through such tunnels at high velocity. By these means it is possible to extract the heat generated in the slot conductors and iron core so as to avoid an impermissible temperature rise provided the product of the total surface area of the axial ventilating ducts (expressed in square feet) and the air velocity therein (expressed in feet per minute) is not less than about $0.30 \times 10^4$ per kilowatt dissipated. I have in fact been able to increase this constant to a value of $0.7 \times 10^4$ and even more by the use of an efficient fan located on the motor shaft within the casing of the motor.

To secure such results it will be found desirable to ensure an air flow in the core ducts of at least 100 cubic feet per minute per kw. of electrical power dissipated in heat, which is quite practicable with a properly design fan.

Although there is less difficulty in cooling the secondary member of a motor than the primary member thereof, it will generally be necessary in motors made according to the present invention to provide cooling ducts in the secondary member as well as in the primary member, particularly in the case of slip ring motors, in view of the greater current densities often used in the secondary conductors of such motors.

When air ducts through both stator and rotor are used they may be arranged in paths which are either pneumatically in parallel or entirely independent so that the ducts in both stator and rotor always receive cool air. More cooling surface and more air flow may be provided in the primary member, usually the stator, than in the secondary member so as to proportion the cooling as far as possible in accordance with the heat to be removed from these members respectively. For the reason already stated the diameter of the air ducts in any case should not be less than one-half or three-eighths of an inch, and they are preferably although not necessarily of circular cross-section.

Heretofore it has been the common practice to fit the stator laminations of induction motors upon longitudinal ribs formed on the inner surface of the yoke or frame so that air can flow over the outer periphery of the stator core for cooling purposes. It is generally found advantageous in carrying out this invention to fit the stator laminations close up against the yoke or frame around its entire periphery, so that heat can be transferred from the laminations direct to the yoke and the latter therefore act usefully as a heat radiator.

In large motors in which rotor spiders are usually employed it is preferable to prevent the cooling air from passing through the spiders so that the passage of air through the spiders may not deprive the ducts in the laminations of the full cooling effect of the available flow of air.

As a further feature of my invention the end windings of the motor are preferably splayed out somewhat more than is usually the case, and the heat conductivity of their insulation improved in the manner previously herein set forth. Furthermore said splayed out end windings are preferably so disposed that air leaving and entering the ducts in the core passes between the end windings at high velocity in order that the scrubbing effect of the high velocity air may be advantageously employed.

Further features of my invention and certain modifications not already referred to will hereinafter be described.

To enable my invention to be clearly understood and readily carried into effect typical examples of motors constructed in accordance therewith will now be described with reference to the accompanying drawings in which:—

Figure 1:
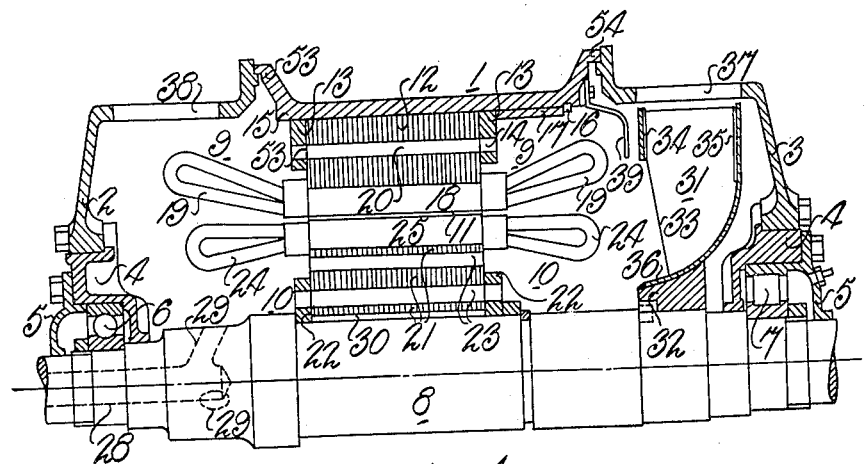
Fig. 1 is a sectional view of the upper part of a slip ring induction motor constructed in accordance with my invention.
Figure 2:
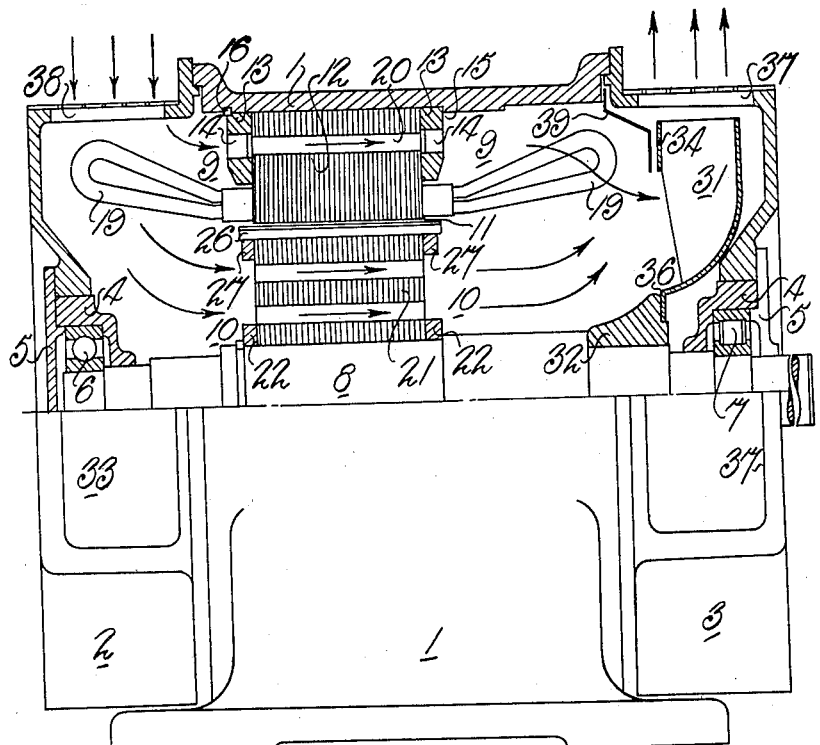
Fig. 2 is a sectional view of a squirrel cage induction motor constructed in accordance with my invention.

Referring to the drawings and more particularly to Figs. 1, 2, 3 and 4 thereof, the motors illustrated by Figs. 1 and 2 comprise the stator frame or yoke 1, end bells 2 and 3 rigidly secured to the frame or yoke 1, said end bells carrying bearing housings 4 and covers 5 within which are located the bearings 6 and 7, the bearing 6 being illustrated as of the ball type and the bearing 7 of the roller type. The motor shaft is shown at 8. The stator laminations and windings are indicated collectively by 9, the rotor laminations and conductors are indicated collectively by 10 whilst the air gap is indicated by 11.

The stator frame or yoke 1 comprises a cylindrical member with the inner surface of which the stator laminations 12 are in substantial contact so that heat can be transferred directly from said laminations to the frame 1 which may thus act usefully as a radiator of heat. The stator laminations are secured between end rings 13 having perforations 14 therein corresponding in size and position with the tunnels or ducts in the stator laminations. Said clamping rings 13 are rigidly secured within the stator frame or yoke in a manner which will be well understood by those skilled in the art. For instance they may be secured by means of shoulders such as 15 provided in the stator frame or yoke and expanding key rings 16. In Fig. 1, 17 is a cylindrical distance piece or spacer between the right-hand clamping ring 13 and the expanding ring 16.

The stator windings are represented conventionally in Fig. 1 by 18 and 19, 18 being a coil within the stator slot and 19 being the end winding of said coil. It will be appreciated that such end windings in practice have a much more complicated formation than that represented owing to the necessary connections and interlacing and that such end coils will in fact be bunched upwards, some of them extending in proximity to the ends of the stator tunnels or ducts, one of which is indicated 20.

The rotor laminations 21 are secured upon the shaft 8 by means of perforated end clamping ring 22. The rotor end windings 24 will in practice assume a more complicated or bunched configuration than shewn, as in the case of the stator end coils 19, as above mentioned.

In Fig. 1 a coil is indicated at 25 within a rotor slot, whilst in Fig. 2 the bars of the squirrel cage are indicated at 26, being secured to copper end rings 27, said bars 26 being not enclosed in insulating material, all in the well-known manner.

In the case of a slip ring motor, such as illustrated in Fig. 1, certain tap points (not shown) of the rotor winding are brought out through the shaft to the slip rings, and for this purpose the axial bore indicated by dotted lines at 28 may be provided, said bore terminating in three radial holes, as indicated by dotted lines at 29, through which holes the phase leads can enter. The terminals of the stator windings may pass out through openings in the stator frame in the well known manner. In Fig. 1, 30 represents a key which may be of usual construction for preventing rotation of the rotor laminations 21 relatively to the shaft 8.

A fan is indicated by 31 mounted upon a cone 32 secured to the right-hand or pulley-end of the shaft 8, said fan comprising a plurality of deep radial blades 33 carried between shrouds 34 and 35, the latter being in the form of a flared disc so as to provide a curved intake at 36. A small clearance space is provided between the circumference of the fan shrouds and the end bell 3, the latter being provided with a plurality of outlet openings 37 circumferentially distributed around the end bell and being provided with the usual gratings.

The end bell 2 at the other end of the motor is provided with corresponding inlet openings 38 and the fan 31 is arranged to draw the air into said openings 38 and through the stator ducts 20 and rotor ducts 23 at high velocity, and in a small measure through the air gap, and to expel it through the openings 37. A circular guide baffle 39 may be secured in the position shown for distributing more advantageously the air for cooling the end windings 19 and 24 at the pulley end of the motor and for assisting the operation of the fan which, it will be understood, is an efficient one, detailed dimensions of the example illustrated in Fig. 2 being hereinafter given.

Figure 3:
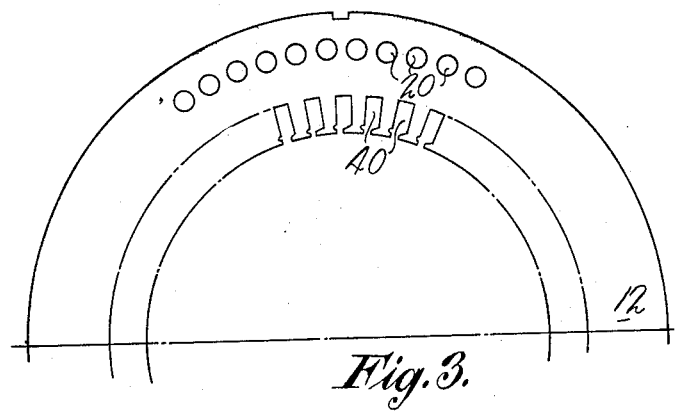
Fig. 3 is a view of part of a stator lamination or "stamping" for the motors illustrated by Figs. 1 and 2.
Figure 4:
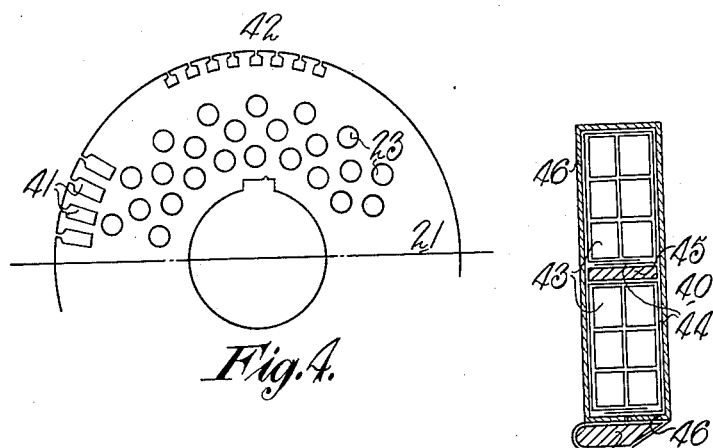
Fig. 4 is a view of part of a rotor lamination or "stamping" for the motors illutrated by Figs. 1 and 2.

Referring now to Figs. 3 and 4, the rotor and stator laminations therein illustrated are those used in the motors illustrated by Figs. 1 and 2. It will be observed that the stator laminations are provided with a single ring of circular ducts 20 whilst the rotor laminations 21 are provided with three rings of circular ducts 23. The stator laminations are formed with slots 40 which may accommodate coils such as illustrated by Fig. 5 whilst the rotor laminations are formed with slots 41 which may accommodate coils such as illustrated by Fig. 6 or with smaller slots 42 for accommodating the squirrel cage bars 26.

Figure 5:
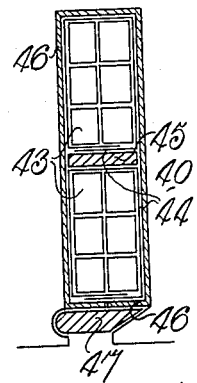
Fig. 5 is a slot section in conventional form of stator conductors which may be used in motors such as illustrated by Figs. 1 and 2.

Referring now to the slot conductors, in Fig. 5 is shown a stator slot section containing two coils each having six conductors 43 of rectangular section, said conductors being arranged one above the other in two banks.

Each conductor is surrounded by a double cotton covering which is indicated in the figure by the spaces around the conductors. The six conductors forming a coil are in turn wrapped in a varnish cloth "cell" as indicated at 44. The two coils are separated by a press-board strip 45 and there is a press-board slot liner 46. The usual slot wedge of fibre for example is indicated by 47.

Figure 6:
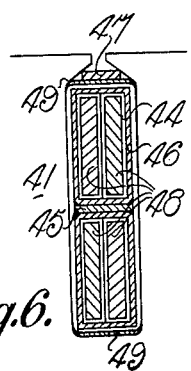
Fig. 6 is a slot section in conventional form of rotor conductors which may be used in a motor such as illustrated by Fig. 1.

In the rotor slot section shewn in Fig. 6 there are four conductors 48 of rectangular section which section is different from the section of the conductors shewn in Fig. 5. The insulation of the conductors 48 (Fig. 6) may be the same as that of the conductors 43 (Fig. 5). Additional press-board strips 49 are shewn at the top and bottom of the slot.

Figure 7:
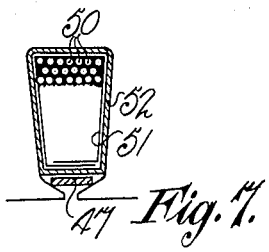
Fig. 7 is a slot section in conventional form of a "mush" coil which may be used in a motor having conductors of circular section.

The slot section shewn in Fig. 7 is of a "mush" coil consisting of wires or conductors 50 of circular section each insulated by the usual double cotton covering. The coil consisting of the wires 50 is surrounded by a varnished cloth covering or "cell" 51 and a slot liner 52 and wedge 47 are provided. Such "mush" coils are used on small power motors wherein the use of conductors of large rectangular cross-section becomes difficult owing to the smallness of the slots.

In Figs. 5, 6 and 7 the thickness of the insulation is exaggerated for the purpose of illustration.

With regard to the conductors of rectangular section (Figs. 5 and 6), these are arranged as hereinbefore set forth so that each one can pass on its heat to a maximum extent to the slot wall without passing through adjacent conductors and by passing through a minimum thickness of the insulating material.

Thus only two conductors lie side by side at the same radial depth in the slot. The cross sectional shape of the conductors is so chosen that with a reasonable depth of slot the area of each conductor adjacent the slot wall is as nearly as possible the same as that of each of the other conductors in the slot and is as large as possible.

It will be appreciated that other arrangements of slot conductors of rectangular section than those shewn in Figs. 5 and 6 may be employed. For example, the conductors may be arranged one above the other in one bank if found convenient.

In the case of "mush" coils (Fig. 7) the spaces between the circular conductors are filled as far as possible with the insulating material of good thermal conductivity.

Owing to the better heat flow from slot conductors which can be obtained by the use of conductors of rectangular section, as above set forth, I prefer to use such rectangular conductors in motors of smaller size than has been the general practice heretofore.

With regard to the actual insulating material for the copper conductors in the slots it is the general present day practice in industrial motors of the kind in question to employ "fibrous material" consisting usually of cotton wrappings and press-board slot liners.

Such insulation is frequently referred to as being "impregnated" but the impregnation has heretofore been effected merely by dipping with or without the use of a moderate vacuum, since investigations and also tests which I have carried out have shown that the depth of penetration of the impregnating material into the insulating material is small and that in fact considerable quantities of imprisoned air still remain, the thermal conductivity being approximately of the low value of 0.00075 watts per inch cube per degree centigrade between the copper and iron faces, taking the insulation as a whole, namely, the cotton wrappings, air spaces and press-board slot liners.

I have found that by carrying out the impregnation so thoroughly as very largely to exclude the air, such as by the use of a comparatively high vacuum, the thermal conductivity of the insulation as a whole can be increased to from 0.001 to 0.005 or even more watts per inch cube per 1° C. difference of temperature between faces.

It is to be understood that the insulation described with reference to Figs. 5, 6 and 7, and impregnated as just above described is given by way of example only of convenient materials and arrangements which may be employed. For instance for rectangular conductors I have successfully used mica and impregnated paper.

There will of course be no press-board around the end windings which will usually be surrounded by bindings of impregnated cotton tape the surface of which may be enamelled.

Considering the squirrel cage motor illustrated by Fig. 2, and constructed in accordance with the invention, the following are certain dimensions of a 100 H. P. 50 cycle 4 pole motor intended to run at 1440 revolutions per minute. The stator stampings 12 (Fig. 3) have an outside diameter of 19.25 inches and an inside diameter of 12.078 inches, each stamping being provided with a total of forty-eight slots 40 equally spaced, each having a depth of 1.2 inches and a width of 0.47 inches. There are sixty circular duct holes 20 of 0.625 inches diameter equally spaced apart, with their centres on a diameter of 17.125 inches.

The rotor stampings or laminations (Fig. 4) are provided with fifty-seven slots 42 equally spaced apart each 0.33 inches deep and 0.33 inches wide. The circular duct holes 23 are 0.625 inches in diameter and there are nineteen holes equally spaced apart, in each of the three rings of holes, with their centres on diameters of 6 inches, 7.5 inches and 8.8 inches respectively. The external diameter of each rotor stamping (Fig. 4) is 12.078 inches in the rough, and this is reduced by machining to about 12.032 inches for the final machine, thus providing an air gap of nearly one-fiftieth of an inch. The internal diameter of the rotor stampings is 4 inches. The length of the core of the motor is 5.75 inches.

It will be observed that there are in number three less cooling ducts in the rotor than in the stator so that the rotor has slightly less cooling surface and it will be appreciated that the cooling of stator and rotor is proportioned roughly in accordance with the heat to be extracted from these members respectively.

The principal dimensions of the fan 31 (Fig. 2) are as follows—the blades are 2.625 inches wide and mounted so that the external diameter of the fan is 18 inches. The ring shroud 34 has an inside diameter of 15.062 inches. The radius of curvature of the flared shroud 35 at its middle portion is 3.375 inches, the outer portion being in a radial plane whilst the inner or hub portion is frusto-conical having a larger diameter of 5.5 inches and an inner diameter of 4.4 inches. The edges 33 of the blades subtend an angle of 10° with the radial plane. There are 19 blades equally spaced.

The weight of the complete motor is 930 lbs. so that the power-weight ratio is 0.107 H. P. per lb. weight.

In a 100 H. P. motor similar to those sold by the assignees in 1928, the stator outside diameter was 22 inches, the air gap diameter 16 inches, the rotor inside diameter 10 inches and the core length 7.5 inches. It will thus be fully appreciated that in spite of the introduction of the cooling ducts in the core the overall dimensions of my improved motor of the same power are materially reduced. An interesting comparison may also be made between the outside and inside core diameters of my improved motor and a motor similar to those sold by the assignees in 1928 and having the same air gap diameter of 12 inches, the power being disregarded. In the earlier motor the outside core diameter was 16.5 inches and the inside core diameter 8 inches.

A further interesting comparison may be made with a motor having similar stator frame dimensions and constructed by the assignees in 1928. The output of this motor was 45 H. P. and the weight 800 lbs., the power-weight ratio thus being 0.056 H. P. per lb. weight. Thus, for the same frame dimensions the power of my improved motor is increased by 122 per cent. as against an increase of about 16 per cent. in the weight. In the improved motor there are 1260 ampere conductors per inch of air gap periphery as against 650 in the 1928 motor under consideration; in the improved motor 4.35 watts of heat are transferred to each square inch of slot surface per 40° C. temperature rise as against 0.55 watts in said 1928 motors.

As another example of the results achieved by this invention it may be stated that in a 50 cycle induction motor having "mush" coils, which has been constructed by the assignees, the measured output is 27 H. P. at 1440 R. P. M., the weight 330 lbs. and the power-weight ratio therefore 0.082 H. P. per lb. weight. In a motor with a similar frame marketed by the assignees in 1928 the output was 12.5 H. P. and the weight 280 lbs., the power-weight ratio thus being 0.044 H. P. per lb. weight. From this it will be seen that for the same frame dimensions the power is increased by 116 per cent. as against an increase of less than 18 per cent. in the weight. In my aforesaid improved motor there are 800 ampere wires per inch of air gap periphery as against 588 in the said 1928 motor. In the improved motor 1.17 watts of heat are transferred to each square inch of slot surface for 40° temperature rise, as against 0.33 watts in the 1928 motor.

The dimensions of the principal parts for a 100 H. P. 50 cycle 4 pole slip ring motor (Fig. 1) intended to run at 1440 R. P. M. may be generally the same as those given above for the squirrel cage motor illustrated by Fig. 2 except that the slots 41 in the rotor stampings or laminations may for example be forty-eight in number, each 1.8 inches deep and 0.4 inches wide and equally spaced apart.

As a still further example of the results achieved by this invention, it may be stated that in an induction motor having "mush" coils which has been constructed experimentally by the assignees the measured output is 5 H. P. at 1420 R. P. M. the weight 91 lbs., and the power-weight ratio therefore 0.055 H. P. per lb. weight. In a motor with a similar frame marketed by the assignees in 1928 the output was 3 H. P. and the weight 90 lbs., the power-weight ratio thus being 0.033 H. P. per lb. weight. From this it will be seen that for the same frame dimensions the power is increased by 67 per cent. as against an increase of less than 1 per cent. in the weight. In the aforesaid improved 5 H. P. motor there are 630 ampere wires per inch of air gap periphery, as against 440 in the 1928 motor. In the improved motor 0.82 watts of heat are transferred to each square inch of slot surface for 40° C. temperature rise, as against 0.44 watts in the 1928 motor.

Figure 8:
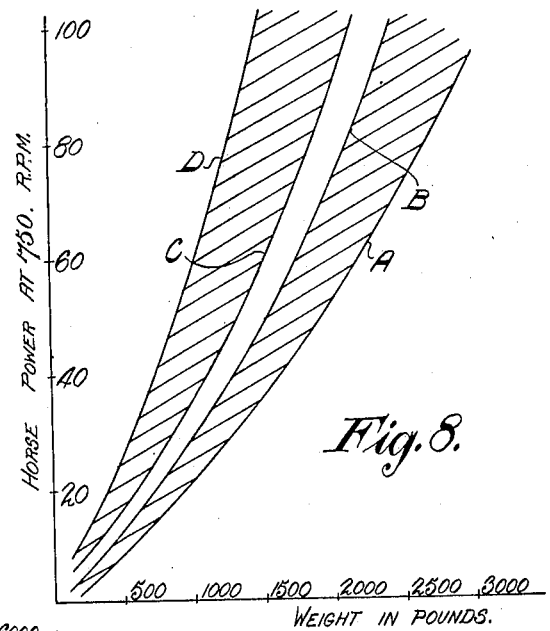
Fig. 8 is a diagram indicating by means of curves the power-weight ratios which can be obtained in motors constructed according to the present invention and those of motors sold in the year 1928.

Referring next to Fig. 8, the curves therein given are of horsepower plotted against the weights of various motors of different power. The zone between curves A and B shows approximately the power-weight ratios of motors marketed by various large English manufacturers in the year 1928. The zone between curves C and D indicates approximately the general increase in the power-weight ratio which can be obtained by the present invention over and above the power-weight ratios of the motors sold in 1928 as indicated by the zone between curves A and B. Curve D shows approximately the power-weight ratios of motors of different power which have actually been constructed by the assignees in accordance with the present invention and which have been fully tested. The curve D indicates an improvement of more than 100 per cent. except for motors of about 10 H. P. and less over the average ratios of the aforesaid 1928 motors. My improved motors (curve D) have high mechanical, thermal, electrical and pneumatic factors of safety, and it is to be understood that curve D does not represent any upper limit to the improvement which can be obtained by my invention. Thus, in particular cases of motors required for use for example in clean atmosphere or in very cold climates and/or in refrigerators or when a greater temperature rise than 40° C. is permissible or when lower factors of safety are permissible the improvement in the power-weight ratio may be materially increased above those indicated by curve D.

In Fig. 8 the increasing steepness of the curves with horsepower and weight is due to the fact that the power-weight ratio of motors falls off at small powers, in spite of the relatively higher current densities which can be used in such motors.

Figure 9:
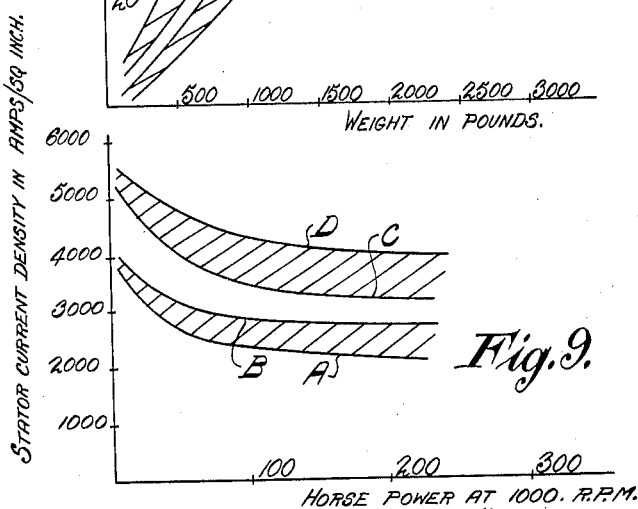
Fig. 9 is a diagram indicating by means of curves the stator current densities which can be used in the motors of the present invention and those ordinarily used in motors sold in the year 1928.

As previously set forth it is a feature of my invention that the current density employed is considerably higher than that ordinarily in vogue for motors sold in 1928. Fig. 9 of the accompanying drawings approximately indicates in the zone between curves A and B the current densities employed in the stator windings of motors as sold by various manufacturers in 1928. The permissible current density varies of course with the size and horsepower of the motor, as previously stated. Thus, the current density is higher for small motors than in larger motors, owing to the greater natural heat radiating or dissipating capacity of small motors although the electrical, mechanical and pneumatic efficiency of small motors must obviously fall with the weight. In Fig. 9, the zone between curves C and D indicates approximately the increase in stator current density which can be employed in motors constructed in accordance with the present invention, over and above the current densities in vogue in motors sold in 1928 as indicated by the curve B.

The curve D indicates the stator current densities employed in motors of different power which have actually been constructed by the assignees in accordance with the present invention and which have been fully tested. The improved motors (curve D) have, as before stated, high factors of safety, so that, as will be understood, the curve D does not represent an upper limit to the increase in current density which I may use in my invention.

As hereinbefore mentioned the flow of cooling air through my improved motors is considerably higher than heretofore, and it may be instructive to indicate the increase in air flow employed in accordance with my invention. Thus, referring finally to Fig. 10, the curves of which in fact correspond with those of Figs. 8 and 9, the zone between curves A and B indicates the air pressures (represented by inches of water) obtaining in motors of different power sold in 1928, whilst the zone between curves C and D indicates approximately the increase in pressure which is employed in carrying out the present invention. The curve D indicates the air pressures employed in a range of motors which have actually been constructed with a large factor of safety.

Figure 10:
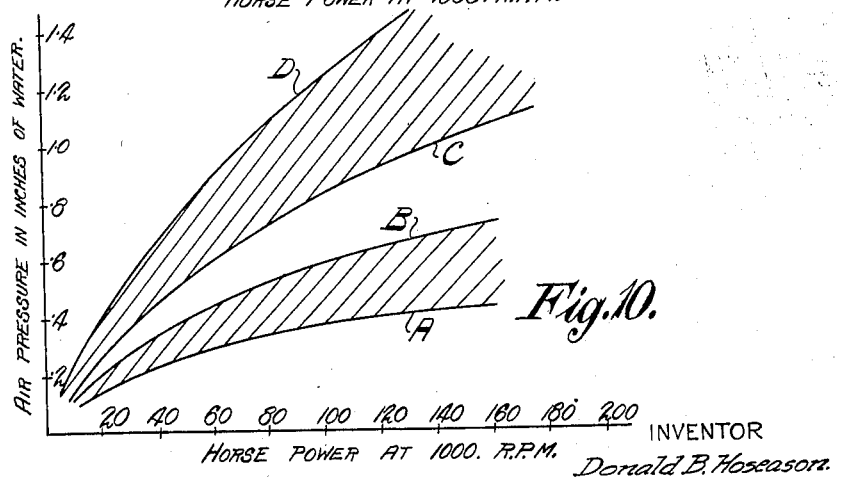
Fig. 10 is a diagram indicating by means of curves the air pressures which are used in motors constructed according to the present invention and those used in motors sold in the year 1928.

It may be mentioned that by employing scientifically designed fans, such as with properly curved and designed blades, outlet diffusers and the like and/or by employing more than one fan in a motor or even by using a separate and adequate air-driving means associated with the motor the pressures shown by the curve D in Fig. 10 may be still further increased without great difficulty, to the material gain in the power-weight ratio in spite of any increase in mechanical fan friction, provided the means hereinbefore described are employed for removing the heat at a corresponding rate from the copper conductors.

It is to be understood that whilst the curves of Figs. 8, 9, and 10 will be useful in assisting designers in constructing motors according to the present invention, said curves are to be considered indicative and approximate rather than exact, it being appreciated, too, that the values of current density, weight and air pressure for motors of different power and type will not necessarily lie on smooth or mean curves such as those shown.

It will be understood further that whilst some of the values (as distinct from dimensions) which I have quoted or indicated by curves, have been actually measured, others have been wholly or in part computed, and my invention is not dependent upon the accuracy of such quoted or

I claim as my invention:—

1. An "industrial" type induction motor comprising laminated stator and rotor cores with a small air gap and a maximum rotor peripheral speed of about 10,000 feet per minute, an impeller for causing external air to flow in contact with the internal motor parts, the core of at least the stator having between the slot base circle and the other periphery a large number of small axially extending air ducts providing substantially pure axial ventilation of the motor and having such total cooling surface area whilst said impeller has such capacity that the "dissipation constant" within said axial ducts is greater than 3000 per kilowatt of electrical energy dissipated in heat, the slot conductor insulation being such that it has a total effective thermal conductivity as between slot conductor and slot walls which permits a flow of heat corresponding closely to the aforesaid "dissipation constant", and a winding of at least the stator of such small cross-sectional area, with slots of correspondingly small cross-sectional area, that the minimum copper current density varies between about 5000 amperes per square inch in small motors and 3000 amperes per square inch in large motors, whereby without the permissible temperature rise being exceeded and the "performance" being impaired, the power/weight ratio is increased with a reduction in cost of the motor more than in proportion to the increases in weight and cost and air flow losses occasioned by the provision of the axial core ducts, high air flow and insulation of a predetermined high thermal conductivity.

2. An "industrial" type induction motor comprising laminated stator and rotor cores with a small air gap and a maximum rotor peripheral speed of about 10,000 feet per minute, an impeller for causing external air to flow in contact with the end windings and cores, the core of at least the stator having between the slot base circle and the other periphery a large number of axially extending air ducts of diameter between about ½–1 inch providing substantially pure axial ventilation of the motor and having such total cooling surface area whilst said impeller has such capacity that the "dissipation constant" within said axial ducts is greater than 3000 per kilowatt of electrical energy dissipated in heat, the slot conductor insulation being such that it has a total effective thermal conductivity as between slot conductor and slot walls which permits a flow of heat corresponding closely to the aforesaid "dissipation constant", and a winding of at least the stator of such small cross-sectional area, with slots of correspondingly small cross-sectional area, that the minimum copper current density varies between about 5000 amperes per square inch in small motors and 3000 amperes per square inch in large motors, whereby without the permissible temperature rise being exceeded and the "performance" being impaired, the power-weight ratio is increased with a reduction in cost of the motor more than in proportion to the increases in weight and cost and air flow losses occasioned by the provision of the axial core ducts, high air flow and insulation of predetermined high thermal conductivity.

3. An "industrial" type induction motor comprising laminated stator and rotor cores with a small air gap and a maximum rotor peripheral speed of about 10,000 feet per minute and an impeller for causing external air to flow serially in contact with the end windings and core, the core of at least the stator having between the slot base circle and the other periphery a large number of small axially extending air ducts providing substantially pure axial ventilation of the motor the end windings at the air emission end of said ducts being splayed so as to receive such emission air, said ducts having such total cooling surface area whilst said impeller has such capacity that the "dissipation constant" within said axial ducts is materially greater than 3000 per kilowatt of electrical energy dissipated in heat, the slot conductor insulation being such that it has a total effective thermal conductivity as between slot conductor and slot walls which permits a flow of heat corresponding closely to the aforesaid "dissipation constant", and a winding of at least the stator of such small cross-sectional area, with slots of correspondingly small cross-sectional area, that the copper current density is materially greater than between about 5000 amperes per square inch in small motors and 3000 amperes per square inch in large motors, whereby without the permissible temperature rise being exceeded and the "performance" being impaired, the power/weight ratio is increased with a reduction in cost of the motor more than in proportion to the increases in weight and cost and air flow losses occasioned by the provision of the axial core ducts high air flow and insulation of predetermined thermal conductivity.

4. An "industrial" type induction motor with a small air gap, comprising a frame, end bells having respectively air inlet and outlet openings, laminated stator and rotor cores with a maximum motor peripheral speed of about 10,000 feet per minute, a fan mounted on the shaft and of diameter approximately equal to the stator diameter, for causing external air to be drawn into the motor at one end and expelled at the other end, the core of at least the stator having between the slot base circle and the other peripherey a large number of small axially extending air ducts the air flowing amongst the end windings at the air inlet end, then through the axial ducts and then impinging on the end windings at the other end, said axial ducts having such total cooling surface area whilst said impeller has such capacity that the "dissipation constant" within said axial ducts is a multiple of 3000 per kilowatt of electrical energy dissipated in heat, the slot conductor insulation being such that it has a total effective thermal conductivity as between slot conductor and slot walls which permits a flow of heat corresponding closely to the aforesaid "dissipation constant", and a winding of at least the stator of such small cross-sectional area, with slots of correspondingly small cross-sectional area, that the minimum copper current density is materially greater than between about 5000 amperes per square inch in small motors and 3000 amperes per square inch in large motors, whereby without the permissible temperature rise being exceeded and the "performance" being impaired, the power/weight ratio is increased with a reduction in cost of the motor more than in proportion to the increases in weight and cost and air flow losses occasioned by the provision of the axial core ducts, high air flow and insulation of predetermined thermal conductivity.

DONALD BRIGHT HOSEASON.